(12) United States Patent
Speranza et al.

(10) Patent No.: US 7,014,947 B2
(45) Date of Patent: Mar. 21, 2006

(54) INTEGRAL MEMBRANE SUPPORT AND FRAME STRUCTURE

(75) Inventors: A. John Speranza, West Hartford, CT (US); Mark E. Dristy, Kutztown, PA (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 587 days.

(21) Appl. No.: 09/963,978

(22) Filed: Sep. 26, 2001

(65) Prior Publication Data

US 2002/0106551 A1 Aug. 8, 2002

Related U.S. Application Data

(60) Provisional application No. 60/235,818, filed on Sep. 27, 2000.

(51) Int. Cl.
 *H01M 2/18* (2006.01)

(52) U.S. Cl. .......................... 429/130; 429/38; 429/39; 429/44; 429/45; 204/252; 204/254; 204/296; 204/297.01

(58) Field of Classification Search .................. 429/38, 429/39, 40, 44, 45, 130, 137; 204/252, 254, 204/258, 296, 297
See application file for complete search history.

(56) References Cited

U.S. PATENT DOCUMENTS

| | | | |
|---|---|---|---|
| 3,533,852 A | 10/1970 | Baker et al. | 136/145 |
| 3,856,573 A | 12/1974 | Groppel | 136/86 R |
| 5,187,025 A | 2/1993 | Kelland et al. | 429/33 |
| 5,942,350 A | 8/1999 | Roy et al. | 429/38 |
| 6,103,078 A * | 8/2000 | Hitchems et al. | 204/296 |
| 6,103,393 A * | 8/2000 | Kodas et al. | 428/570 |
| 6,218,035 B1 * | 4/2001 | Fuglevand et al. | 429/30 |
| 6,254,741 B1 | 7/2001 | Stuart et al. | 204/254 |
| 6,258,861 B1 * | 7/2001 | Steck et al. | 521/27 |
| 6,427,639 B1 * | 8/2002 | Andrews et al. | 123/3 |

FOREIGN PATENT DOCUMENTS

| | | |
|---|---|---|
| WO | WO 97/38461 | 10/1997 |
| WO | WO 98/21777 | 8/1998 |
| WO | WO 00/40780 | 7/2000 |

OTHER PUBLICATIONS

International Search Report, International Application No. PCT/US 01/30140, International Filing Date: Sep. 26, 2001, Date of Mailing: Jun. 9, 2004, 8 pages.

* cited by examiner

*Primary Examiner*—Bruce F. Bell
(74) *Attorney, Agent, or Firm*—Cantor Colburn LLP

(57) ABSTRACT

An electrochemical cell includes a first electrode, a second electrode, and a proton exchange membrane disposed between and in intimate contact with the electrodes. The proton exchange membrane is configured to be integral with a frame structure and includes a substrate disposed in contiguous contact with the frame structure and a proton exchange material disposed at the substrate.

27 Claims, 3 Drawing Sheets

US 7,014,947 B2

INTEGRAL MEMBRANE SUPPORT AND FRAME STRUCTURE

CROSS REFERENCE TO RELATED APPLICATIONS

This application claims the benefit of U.S. Provisional Patent Application Ser. No. 60/235,818 filed Sep. 27, 2000, the entire content of which is incorporated herein by reference.

BACKGROUND

This disclosure relates to electrochemical cells, and, more particularly, to an apparatus in which a membrane support member is integrally formed with a frame assembly.

Electrochemical cells are energy conversion devices that are usually classified as either electrolysis cells or fuel cells. Proton exchange membrane electrolysis cells can function as hydrogen generators by electrolytically decomposing water to produce hydrogen and oxygen gases. Referring to FIG. 1, an anode feed electrolysis cell of the related art is shown at 10 and is hereinafter referred to as "cell 10." Reactant water 12 is fed to cell 10 at an oxygen electrode (e.g., an anode) 14 where a chemical reaction occurs to form oxygen gas 16, electrons, and hydrogen ions (protons). The chemical reaction is facilitated by the positive terminal of a power source 18 connected to anode 14 and a negative terminal of power source 18 connected to a hydrogen electrode (e.g., a cathode) 20. Oxygen gas 16 and a first portion 22 of the water are discharged from cell 10, while the protons and a second portion 24 of the water migrate across a proton exchange membrane 26 to cathode 20. At cathode 20, hydrogen gas 28 is formed and is removed for use as a fuel. Second portion 24 of water, which is entrained with hydrogen gas, is also removed from cathode 20.

Another type of water electrolysis cell that utilizes the same configuration as is shown in FIG. 1 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the cell at the cathode side without passing through the membrane.

A typical fuel cell also utilizes the same general configuration as is shown in FIG. 1. Hydrogen gas is introduced to the hydrogen electrode (the anode in the fuel cell), while oxygen, or an oxygen-containing gas such as air, is introduced to the oxygen electrode (the cathode in the fuel cell). The hydrogen gas for fuel cell operation can originate from a pure hydrogen source, a hydrocarbon, methanol, an electrolysis cell, or other source that supplies hydrogen at a purity level suitable for fuel cell operation. Hydrogen gas electrochemically reacts at the anode to produce protons and electrons, the electrons flow from the anode through an electrically connected external load, and the protons migrate through the membrane to the cathode. At the cathode, the protons and electrons react with oxygen to form water.

Conventional electrochemical cell systems generally include one or more individual cells arranged in a stack, with the working fluids directed through the cells via input and output conduits formed within the stack structure. The cells within the stack are sequentially arranged, each including a membrane electrode assembly (hereinafter "MEA") defined by a cathode, a proton exchange membrane, and an anode. Each cell typically further comprises a first flow field in fluid communication with the cathode and a second flow field in fluid communication with the anode. The MEA may be supported on either one side or both sides by flow field support members such as screen packs or bipolar plates disposed within the flow fields, and which may be configured to facilitate membrane hydration and/or fluid movement to and from the MEA.

Each cell of the cell system and its supporting structure is held in place by frames. A protector ring is typically positioned adjacent to the gap defined by the juncture of the inside perimeter of the opening of the frame and the flow field support member. Because the surface of the protector ring that covers the gap is only slightly larger than the gap itself, positioning of the protector ring over the gap oftentimes results in "pinching" of the protector ring between the frame and the flow field during the assembly of the cell system or its operation. Such pinching may cause a misalignment of the protector ring over the gap, thereby resulting in a less than optimum performance of the cell system in general.

Furthermore, resistance to the electrical communication may result from the misalignment of the protector rings, thereby affecting the performance of the electrochemical cell. In particular, the power production of fuel cells and the power consumption of electrolysis cells may be adversely affected by increases in electrical resistance caused by discontinuities between the MEA and flow fields. Such discontinuities may be caused by damage of the MEA resulting from the pinching of the MEA in the gap between the frame and the flow field.

While existing frames and protector rings may be suitable for their intended purposes, there remains a need for improvements, particularly regarding the prevention of misalignment of the protector rings relative to the gaps between the cell frames and the flow field support members. Such a need may be addressed by the integration of a frame with its associated cell components to eliminate the gap between the frame and the cell structure, thereby allowing optimum performance of the electrolysis cell to be realized.

SUMMARY

The above-described drawbacks and disadvantages are alleviated by an electrochemical cell comprising a first electrode, a second electrode, and a proton exchange membrane disposed between and in intimate contact with the electrodes. The proton exchange membrane is configured to be integral with a frame assembly and includes a substrate disposed in contiguous contact with the frame assembly and a proton exchange material disposed at the substrate.

The above discussed and other features and advantages will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike in the several FIGURES.

DETAILED DESCRIPTION

A novel apparatus that facilitates the migration of protons within an electrochemical cell system is described below. The apparatus is a proton exchange medium contiguously disposed at a frame that supports the medium within the cell system. The contiguity of the medium with the frame eliminates the gap between the medium and the frame. Unlike conventional proton exchange mediums, the underlying substrate of the medium provides support to the cell system into which the medium is incorporated. The medium/frame can be utilized in conjunction with anode feed electrolysis cells, cathode feed electrolysis cells, and fuel cells. A flow field support member may also be contiguously disposed at a frame to eliminate the gap between the flow field support member and the frame. In a fuel cell, a plate configured to distribute fluids to provide a cooling effect to the cell system may further be contiguously disposed at a frame.

Figure 1:
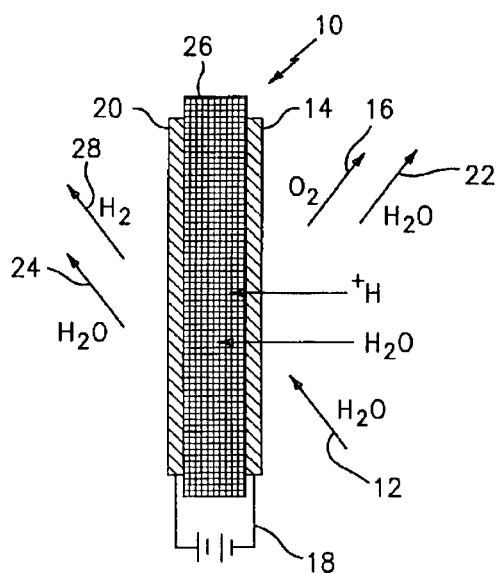
FIG. 1 is a schematic representation of an anode feed electrolysis cell of the related art.
Figure 2:
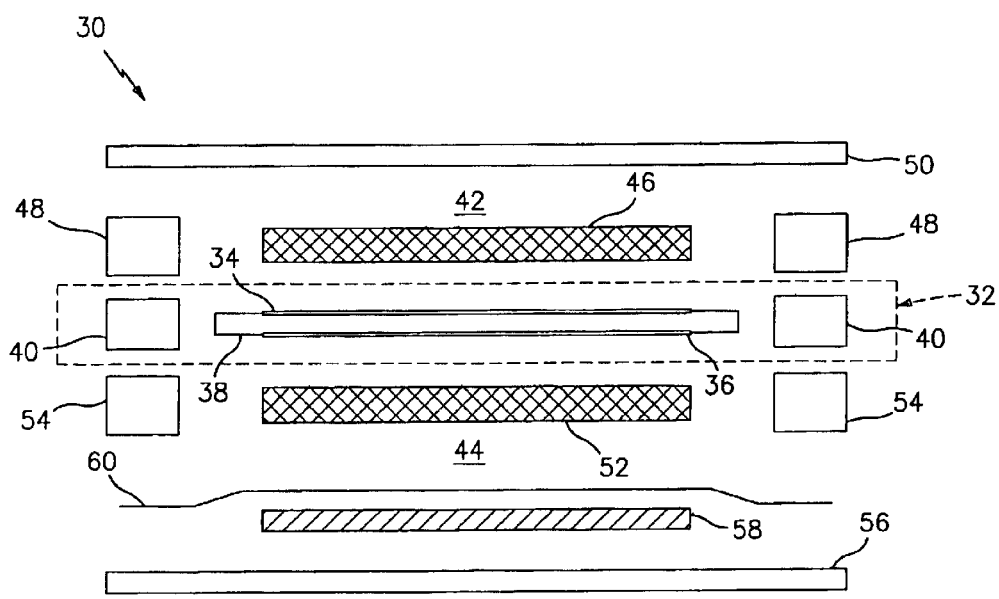
FIG. 2 is a cross sectional schematic representation of a conventional electrochemical cell system showing the spatial relationship of the cell components.

Referring to FIG. 2, one exemplary embodiment of an electrochemical cell system suitable for operation as an anode feed electrolysis cell, a cathode feed electrolysis cell, a fuel cell, or a regenerative fuel cell is shown at 30. Cell system 30 includes a proton exchange medium/frame assembly, shown generally at 32, that includes an MEA. The MEA is defined by an anode 34, a cathode 36, and a proton exchange membrane 38 contiguously disposed at a frame 40 by being integrally formed with frame 40. Regions proximate to and bounded on at least one side by anode 34 and cathode 36 respectively define flow fields 42, 44. A flow field support member 46 is disposed adjacent to anode 34 and is retained within flow field 42 by a frame 48 and a cell separator plate 50. A flow field support member 52 is disposed adjacent to cathode 36 and is retained within flow field 44 by a frame 54 and a cell separator plate 56. A pressure pad 58 is disposed between flow field support member 52 and cell separator plate 56. A pressure pad separator plate 60 may optionally be disposed between pressure pad 58 and flow field support member 52. The cell components, particularly frames 40, 48, 54 and cell separator plates 50, 56, are formed with the suitable fluid flow conduits and manifolds to facilitate fluid communication through cell system 30.

Figure 3A:
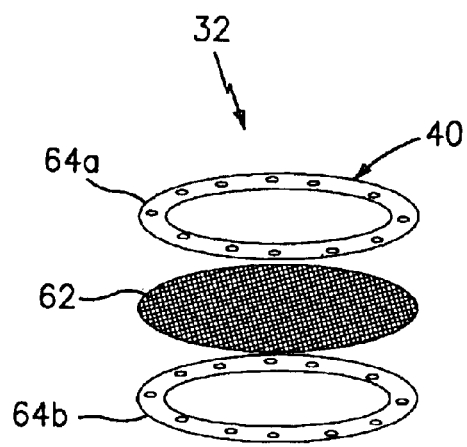
FIGS. 3A and 3B are exploded views of integrally formed proton exchange medium/frame assemblies.
Figure 3B:
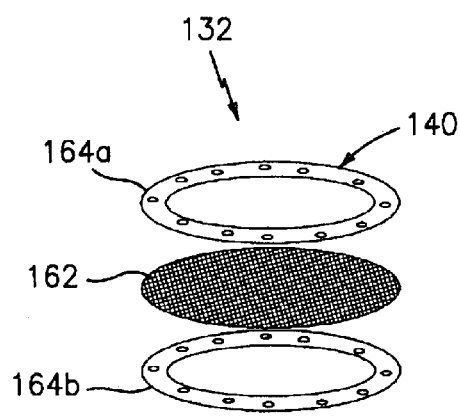

Referring to FIG. 3A, one exemplary embodiment of medium/frame assembly 32 comprises a substrate 62 integrally disposed within frame 40 wherein frame 40 comprises mating frame halves 64a, 64b. The integral configuration of substrate 62 and frame 40 is defined by a contiguity of the surfaces extending from substrate 62 to frame halves 64a, 64b and including the surfaces of substrate 62 and frame halves 64a, 64b. Substrate 62 is preferably of screen form, which may be mounted between frame halves 64a, 64b such that substrate 62 registers with the opening defined by frame halves 64a, 64b. Alternatively, substrate 62 may comprise a plurality of screens positioned such that opposing faces thereof are disposed in contact with adjacently positioned screens in a layered arrangement. In an alternate exemplary embodiment of medium/frame assembly shown at 132 in FIG. 3B, a substrate 162 may be configured as a porous planar member disposed at a frame 140, which may be defined by frame halves 164a, 164b. Alternately, the substrate may be configured as a stranded layer, a weave, or the like, or as any combination of screens, porous planar members, stranded layers, and weaves.

Irrespective of the substrate configuration, a plurality of substrates 62 and/or frames 40 may be disposed in communication to define medium/frame assembly 32 and to provide support for the cell structure. The specific substrate configuration is generally determined by factors including, but not limited to, the desired membrane structural integrity, the desired fluid flow rates, and the desired gas production rate. Furthermore, substrate 62 is typically electrically conductive and includes open area (e.g., through-holes, perforations, vias, or the like) sufficient to facilitate fluid communication between electrodes disposed on substrate 62.

Substrate 62 is fabricated from materials suitable for supporting the proton exchange material and compatible with the cell system environment. Such materials can be provided as screens, mesh configurations, porous plates, and the like. Alternately, the materials may be provided in particulate form (e.g., as powders) and formed to the desired substrate geometry in a pressing operation or a molding operation. Suitable materials from which substrate 62 can be fabricated include, but are not limited to, metals (e.g., nickel, niobium, cobalt, zirconium, titanium, iron, tantalum, alloys and blends of the foregoing metals), ceramics, polymers, carbon, carbon composites, and graphite.

The proton exchange material is disposed on substrate 62 via a dipping, spraying, vapor deposition, brushing, or similar operation. Alternatively, for a substrate of pressed particulate material or molded material, the proton exchange material can be mixed into the particulate substrate material prior to the pressing operation or the molding operation. In either configuration, the materials of fabrication are selected such that the porosity of substrate 62 is generally between about 20% void volume and about 80% void volume, and is preferably between about 40% void volume and about 50% void volume.

The proton exchange material can be any material typically employed for forming the membrane in electrochemical cells. The electrolytes are preferably solids or gels under the operating conditions of the electrochemical cell. Useful materials include proton conducting ionomers and ion exchange resins. Useful proton conducting ionomers can be complexes of an alkali metal, alkali earth metal salt, or a protonic acid with one or more polar polymers such as a polyether, polyester, or polyimide, or complexes of an alkali metal, alkali earth metal salt, or a protonic acid with a network or crosslinked polymer containing the above polar polymer as a segment. Useful polyethers include polyoxyalkylenes, such as polyethylene glycol, polyethylene glycol monoether, polyethylene glycol diether, polypropylene glycol, polypropylene glycol monoether, and polypropylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; esters, such as phosphoric acid esters, aliphatic carboxylic acid esters or aromatic carboxylic acid esters of the above polyoxyalkylenes. Copolymers of, e.g., polyethylene glycol with dialkylsiloxanes, polyethylene glycol with maleic anhydride, or polyethylene glycol monoethyl ether with methacrylic acid are known in the art to exhibit sufficient ionic conductivity to be useful. Useful complex-forming reagents can include alkali metal salts, alkali metal earth salts, and protonic acids and protonic acid salts. Counterions useful in the above salts can be halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, tetrafluoroethylene sulfonic acid, hexafluorobutane sulfonic acid, and the like.

Ion-exchange resins useful as proton conducting materials include hydrocarbon- and fluorocarbon-type resins. Hydrocarbon-type ion-exchange resins can include phenolic or sulfonic acid-type resins; condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of a tetrafluoroethyleneperfluorosulfonyl ethoxyvinyl ether or tetrafluoroethylene-hydroxylated (perfluoro vinyl ether) copolymers. When oxidation and/or acid resistance is desirable, for example, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is the NAFION™ resins (DuPont Chemicals, Wilmington, Del.).

It should be appreciated by those of skill in the art that any of the above proton exchange materials can be provided in electrolyte mixtures. The electrolyte mixtures may comprise any of the above proton exchange materials, water, alcohols such as propanol (e.g., 1-propanol and 2-propanol) and methanol, and other volatile organic compounds (VOCs).

Frame 40 may be formed of mating frame halves 64a, 64b, as is shown, or it may be a unitary piece. In either configuration, frame 40 may be made integral with substrate 62 to form the contiguous medium/frame assembly 32 by any one or a combination of various methods. In one exemplary method of integrating frame 40 and substrate 62, the material from which frame 40 is fabricated is melted into the peripheral surfaces of substrate 62. Alternately, frame 40 can be extruded into substrate 62. Specific conditions and procedures for performing the melting or the extrusion are dependent upon the particular material from which frame 40 is fabricated and upon the structure of medium/frame assembly 32. Any number of frames and screens can be arranged in alternating sequences wherein the frames are melted together with heat or pressure or extruded to form a membrane/frame assembly. The temperatures and pressures are generally such that fluid flow conduits and manifolds within the frames are not blocked or otherwise deformed beyond operability. Typically, with thermoplastic materials, temperatures of about 250° F. to about 500° F. and pressures of about 10,000 pounds per square inch (psi) to about 20,000 psi are used. Once heated, the material is cooled slowly to reduce thermal stressing of the finished part. Other exemplary methods of integrating frame 40 and substrate 62 include casting or molding substrate 62 with frame 40 and brazing or welding substrate 62 directly to frame 40.

Materials for frame 40 include, but are not limited to, materials similar or identical to the substrate materials (including ceramics, niobium, zirconium, tantalum, titanium, iron, nickel, carbon, cobalt, and mixtures and alloys of at least one of the foregoing), and thermoset, thermoplastic, and rubber materials, such as polysulfone, polyethersulfone, polyetherimide (e.g., ULTEM® 1000, commercially available from General Electric Company, Pittsfield, Mass.), and polyarylether ketone (PEEK), VITON® (commercially available from E. I. duPont de Nemours and Company, Wilmington, Del.), ethylenepropylenediene monomer, ethylenepropylene rubber, and mixtures of at least one of the foregoing materials.

Figure 4:
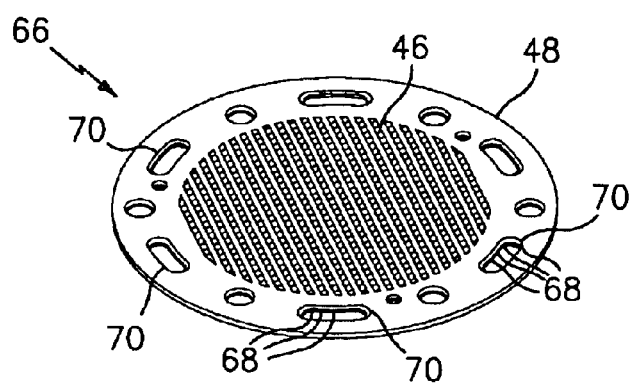
FIG. 4 is a perspective view of an integrally formed flow field support member/frame assembly having a round geometry and a spirally configured fluid flow channel.

Frames can further be integrally formed with flow field support members to provide support to the electrochemical cell structure. Referring now to FIG. 4, one exemplary embodiment of a flow field support member integrated with a frame is shown at 66 and comprises frame 48 integrally disposed with flow field support member 46 in a manner similar to that in which frame 40 was integrally formed with substrate 62 to form medium/frame assembly 32. As above, frame 48 may be made integral with flow field support member 46 by any one or a combination of various methods. One method includes the melting the peripheral edges of flow field support member 46 into frame 48 to obtain the integrated flow field support member/frame assembly 66, as is shown in FIG. 4. Other methods include, but are not limited to, the extrusion of frame 48 into the peripheral edges of flow field support member 46. Also as above, frame 48 is configured to provide for fluid communication therethrough by being formed with or having disposed therein fluid flow conduits 68 and manifolds 70.

In order to maintain the efficient operation of the fuel cell into which cell system 30 is incorporated, measures may be taken to remove the heat generated during operation of the cell. Such measures generally include thermal communication maintained between membrane 38 and a fluid circulating through cell system 30. Although gas may be utilized as the fluid, liquid is generally preferred due to the fact that larger diameter manifolds and flow conduits are often utilized for gas cooling systems. The preferred liquid for use in cell system 30 is water, although other liquids may be utilized.

Figure 6:
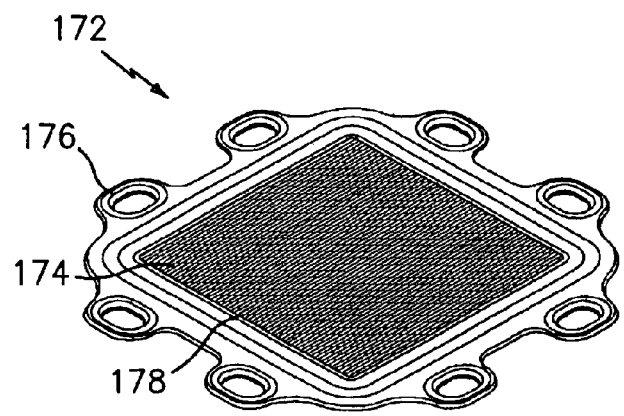
FIG. 6 is a perspective view of an integrally formed flow field support member/frame assembly having a rectilinear geometry and a rectilinear and parallel configured fluid flow channel.
Figure 5:
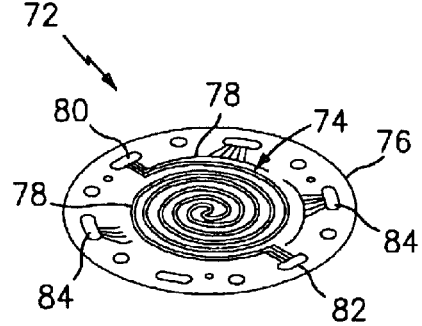
FIG. 5 is a perspective view of a cooling apparatus in which a cooling plate is integrally formed with a frame structure.

To provide for the removal of heat, a cooling apparatus, as is shown at 72 in FIG. 5, may be incorporated into an electrochemical cell system. Cooling apparatus 72 is generally disposed adjacent to and in direct contact with the membrane/frame assembly of the electrochemical cell system and is defined by a monolithic structure that comprises a cooling plate 74 integrally formed with a frame 76. Cooling plate 74 is fabricated from any material compatible with the cell system environment and is configured to provide fluid communication in and out of a cell system into which cooling apparatus 72 is incorporated. Channels 78 disposed within a major face of cooling plate 74 provide means through which water may flow to remove sensible heat generated by the electrochemical reaction at the membrane during operation of the cell system. Fabrication of channels 78 is typically effected by methods that include, but are not limited to, photochemical etching, diffusion bonding, and laser machining. Although the cooling apparatus is illustrated as being round and having a channel arranged in a spiral pattern, it should be understood by those of skill in the art that the cooling apparatus may be rectilinearly configured, as is shown at 172 in FIG. 6. The frame 176 and the cooling plate 174 may also be rectilinear. Furthermore, the channel may be configured in a different pattern, e.g., in an arrangement of parallel rows (as is shown at 178), or the like, that provide for optimum or at least effective heat removal.

In any embodiment, fluid flow openings are disposed within and across the opposing major faces of the cooling plate to allow for fluid communication between adjacently positioned cells (not shown) within cell system. As illustrated in FIG. 5, the fluid flow openings include a flow inlet 80 and a flow outlet 82 through which water is circulated to provide a heat exchange, thereby removing heat from the cell system. Other fluid flow openings may be hydration ports 84, through which water flow is maintained to hydrate the membrane.

Frame 76 may be made integral with cooling plate 74 by any one or a combination of various methods. In one exemplary method of integrating frame 76 and cooling plate 74, the material from which frame 76 is fabricated is extruded into the peripheral surfaces of cooling plate 74. Specific conditions and procedures for performing such the extrusion are dependent upon the particular material from which frame 76 is fabricated and upon the structure of cooling apparatus 72. For example, a frame fabricated from a thermoplastic material can be integrated with a cooling plate by melting the frame into the peripheral edges of the cooling plate. As above, other exemplary methods of integrating frame 76 and cooling plate 74 include casting or molding cooling plate 74 with frame 76 and brazing or welding cooling plate 74 directly to frame 76. Also as above, materials of fabrication for frame 76 include the materials of fabrication for frame 76 of membrane/frame assembly 72.

Figure 7:
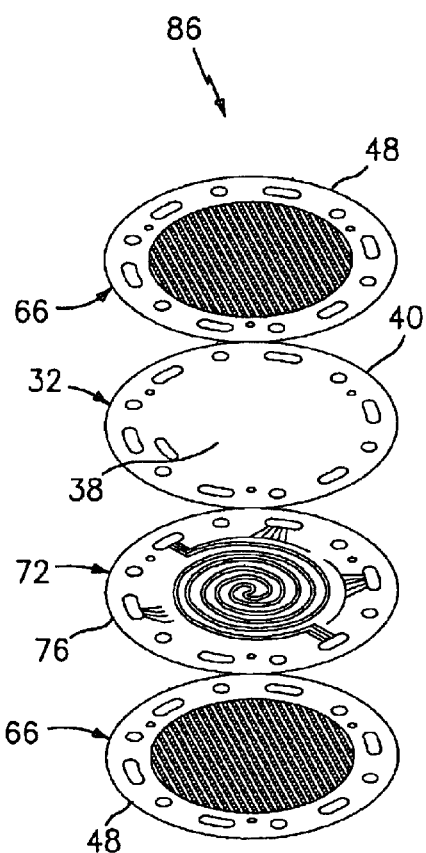
FIG. 7 is an exploded view of a cell system incorporating elements integrally formed with frame assemblies.

Referring now to FIG. 7, an exemplary embodiment of a cell system for a fuel cell is shown at 86. Cell system 86 incorporates the integrally formed medium/frame assembly 32, two integrally formed flow field support member/frame assemblies 66, and the integrally formed cooling apparatus 72 disposed adjacent medium/frame assembly 32 and one of the integrated flow field support member/frame assemblies 66. Electrodes (not shown) are disposed on opposing sides of membrane 38 of medium/frame assembly 32. A pressure pad (as is shown at 58 with reference to FIG. 2) may optionally be disposed in cell system 86. Gaskets (not shown) may be disposed at the appropriate locations within cell system 86, e.g., between frame 48 and frame 76, between frame 76 and frame 40, and between frame 40 and frame 48 of the second integrated flow field support member/frame assembly 66 to effectively seal the cell.

The opposingly positioned flow field support member/frame assemblies 66 are bounded by cell separator plates (shown at 50 and 56 with reference to FIG. 2). The cell separator plates can be formed of any material that is compatible with the electrochemical cell environment and is capable of bonding to frames 66. Materials from which the cell separator plates can be fabricated include, but are not limited to, thermosets, thermoplastics, and rubber materials, such as polyetherimide (e.g., ULTEM® 1000, which is commercially available from General Electric Company, Pittsfield, Mass.), polysulfone, polyethersulfone, and polyarylether ketone (PEEK), VITON® (commercially available from E. I. dupont de Nemours and Company, Wilmington, Del.), ethylenepropylenediene monomer, ethylenepropylene rubber, and mixtures of at least one of the foregoing.

EXAMPLE

An integrated frame and substrate assembly in which the surfaces of each are contiguous may be formed by integrating a layer of 100 mesh screen formed of platinum and plated with titanium between frame members fabricated from a thermoplastic resin. An electrolyte mixture of 50% water, 15% 1-propanol, 15% 2-propanol, 5% methanol, 5% other VOCs, and 10% liquid NAFION™ may be formed, brushed onto the screen, and allowed to dry, thereby forming the substrate. The frame and substrate assembly can then be heated to a temperature of about 350° F. and pressed at a pressure of about 100 psi to cause the electrolyte to flow into and adhere to the frame such that a substantially contiguous surface is defined between the frame and the substrate.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A membrane electrode assembly for an electrochemical cell, comprising:
    a first electrode;
    a second electrode; and
    a membrane disposed between the first electrode and the second electrode, the membrane comprising a substrate providing support to the first electrode and the second electrode, the substrate being contiguously disposed at a first frame.

2. The membrane electrode assembly for an electrochemical cell of claim 1, wherein the substrate includes a proton exchange material disposed thereon.

3. The membrane electrode assembly for an electrochemical cell of claim 1, wherein the substrate in a screen.

4. The membrane electrode assembly for an electrochemical cell of claim 1, wherein the substrate is a porous planar member.

5. The membrane electrode assembly for an electrochemical cell of claim 1, wherein the first frame comprises a first frame half and a second frame half between which the substrate is disposed.

6. The membrane electrode assembly for an electrochemical cell of claim 1, further comprising a flow field support member disposed adjacent to the first electrode, the flow field support member being contiguously disposed at a second frame, the second frame being disposable adjacent to the first frame.

7. The membrane electrode assembly for an electrochemical cell of claim 1, further comprising a cooling plate disposed adjacent to the first electrode, the cooling plate being contiguously disposed at a third frame, the third frame being disposable adjacent to the first frame.

8. A membrane for an electrochemical cell, the membrane comprising:
    a frame;
    a substrate disposed in contiguous contact with the frame; and
    a proton exchange material disposed at the substrate.

9. The membrane of claim 8, wherein the substrate is a screen.

10. The membrane of claim 8, wherein the substrate is a porous planar member.

11. The membrane of claim 10, wherein the porous planar member is a particulate material formed to the desired shape of the substrate.

12. The membrane of claim 11, wherein the proton exchange material is dispersed throughout the particulate material.

13. The membrane of claim 8, wherein the frame is melted into a peripheral surface of the substrate to obtain the contiguous contact therebetween.

14. The membrane of claim 8, wherein the frame is extruded into a peripheral surface of the substrate to obtain the contiguous contact therebetween.

15. The membrane of claim 8, wherein the substrate is from about 20% porous to about 80% porous.

16. The membrane of claim 8, wherein the substrate is fabricated from a material selected from the group consisting of metals, ceramics, carbon, carbon composites, graphite, and combinations of the foregoing materials.

17. The membrane of claim 8, wherein the frame is fabricated from a material selected from the group consisting of metals, ceramics, thermosets, thermoplastics, rubber, and combinations of the foregoing materials.

18. A cooling apparatus for an electrochemical cell, the cooling apparatus comprising:
   a frame; and
   a plate disposed in contiguous contact with the frame, the plate including a channel disposed thereat, the channel being configured to receive a fluid flow therethrough to transfer heat from the electrochemical cell.

19. The cooling apparatus of claim 18, wherein the channel is disposed at the plate by an operation selected from the group consisting of photochemical etching, diffusion bonding, machining, and combinations of the foregoing operations.

20. The cooling apparatus of claim 18, wherein the channel is arranged in a spiral pattern on the plate.

21. The cooling apparatus of claim 18, wherein the channel is arranged in a continuous parallel configuration on the plate.

22. The cooling apparatus of claim 18, wherein the frame is melted into a peripheral suffice of the plate to obtain the contiguous contact therebetween.

23. The cooling apparatus of claim 18, wherein the frame is extruded into a peripheral surface of the cooling plate to obtain the contiguous contact therebetween.

24. An electrochemical cell, comprising:
   a first electrode;
   a second electrode;
   a membrane disposed between the first electrode and the second electrode, the membrane comprising an integrated proton exchange material and a substrate providing support to the first electrode and the second electrode, the substrate being contiguously disposed at a first frame;
   a first flow field in fluid communication with aid first electrode opposite said membrane; and
   a second flow field in fluid communication with said second electrode opposite said membrane.

25. The electrochemical cell of claim 24, wherein the proton exchange material is a sulfonated phenol-formaldehyde, sulfonated polystyrene, sulfonated styrene-divinyl benzene copolymer, sulfonated styrene-butadiene copolymer, sulfonated styrene-divinylbenzene-vinylchloride terpolymers, a hydrate of a tetrafluoroethyleneperfluorosulfonyl ethoxyvinyl ether copolymer, a hydrate of a tetrafluoroethylene-hydroxylated copolymer, or a sulfonated fluorocarbon resin.

26. A flow field support member for an electrochemical cell, the flow field support member comprising:
   a frame, wherein the frame is melted into a peripheral surface of the flow field support member to obtain the contiguous contact therebetween; and
   a support surface disposed in contiguous contact with the frame.

27. A flow field support member for an electrochemical cell, the flow field support member comprising:
   a frame, wherein the frame is extruded into a peripheral surface of the flow field support member to obtain the contiguous contact therebetween; and
   a support surface disposed in contiguous contact with the frame.

* * * * *